(12) United States Patent
Gray et al.

(10) Patent No.: US 7,502,539 B2
(45) Date of Patent: Mar. 10, 2009

(54) RARE EARTH DOPED OPTICAL FIBER

(75) Inventors: Stuart Gray, Corning, NY (US);
Donnell Thaddeus Walton, Painted Post, NY (US); Ji Wang, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 107 days.

(21) Appl. No.: 11/540,099

(22) Filed: Sep. 29, 2006

(65) Prior Publication Data

US 2008/0080823 A1   Apr. 3, 2008

(51) Int. Cl.
*G02B 6/02* (2006.01)
*G02B 6/00* (2006.01)

(52) U.S. Cl. .................. 385/123; 385/127; 385/126; 385/141; 385/144

(58) Field of Classification Search ......... 385/123–124, 385/126–128, 141–142, 144, 146
See application file for complete search history.

(56) References Cited

U.S. PATENT DOCUMENTS

| | | | |
|---|---|---|---|
| 5,949,941 A | 9/1999 | DiGiovanni | 385/127 |
| 5,966,491 A | 10/1999 | DiGiovanni | 385/127 |
| 6,411,762 B1 | 6/2002 | Anthon et al. | 385/123 |
| 6,477,307 B1 | 11/2002 | Tankala et al. | 385/127 |
| 6,483,973 B1 | 11/2002 | Mazzarese et al. | 385/123 |
| 7,139,458 B2 | 11/2006 | Koh et al. | 385/127 |
| 7,203,407 B2 | 4/2007 | Berkey et al. | 385/123 |
| 7,236,672 B2 | 6/2007 | Walton et al. | 385/122 |
| 7,313,312 B2 | 12/2007 | Kimball et al. | 385/142 |
| 2005/0158006 A1* | 7/2005 | Koh et al. | 385/143 |

OTHER PUBLICATIONS

Yb3+-doped double-clad fibers and lasers; A. S. Kurkov et al; Advances in Fiber Optics, Proceedings of SPIE vol. 4083 (2000); p. 118-126.*

Ytterbium-doped large-core fibre laser with 1kW of continuous-wave output power; Y. Jeong, et al; Electronics Letters, Apr. 15, 2004; vol. 40, No. 8.

Yb3+-doped double-clad fibers and lasers; A. S. Kurkov et al; Advances in Fiber Optics, Proceedings of SPIE vol. 4083; p. 118-126.

Lifetime quenching in Yb-doped fibers; R. Paschotta et al; Optical Communications 136 (1997) 375-378.

158-μJ pulses from a single-transverse-mode, large-mode-area erbium-doped fiber amplifier; D. Taverner et al; Optics Letters; vol. 22, No. 6; Mar. 15, 1997; p. 378-380.

* cited by examiner

*Primary Examiner*—Frank G Font
*Assistant Examiner*—Michael P Mooney
(74) *Attorney, Agent, or Firm*—Svetlana Z. Short (57) ABSTRACT

An optical fiber including: (i) a silica based, Yb doped core having a first index of refraction $n_1$, said core comprising more than 1 wt % of Yb, said core having less than 5 dB/km loss at a wavelength situated between 1150 nm and 1350 nm and less than 20 dB/km loss at the wavelength of 1380 nm and slope efficiency of over 0.8; and (ii) at least one silica based cladding surrounding the core and having a second index of refraction $n_2$, such that $n_1 > n_2$.

15 Claims, 10 Drawing Sheets

Fig 7. SBS threshold power via the Yb-doped fiber length

RARE EARTH DOPED OPTICAL FIBER

Parts of this invention were made with Government support under Agreement No. MDA972-02-3-004 awarded by DARPA. The Government may have certain rights in some of the claims of the invention.

BACKGROUND OF THE INVENTION

The present invention relates generally to optical waveguide fibers, and more particularly to a rare earth doped optical fiber with a high rare earth concentration.

FIELD OF THE INVENTION

The present invention relates generally to high concentration rare-earth doped optical fibers, and particularly to all glass rare earth doped double-clad optical fibers suitable for use with high power light sources or in optical fiber lasers and optical amplifiers.

TECHNICAL BACKGROUND

Optical fiber has become a favorite medium for telecommunications due to its high capacity and immunity to electrical noise. Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skilled in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer. Optical fibers with Yb doped cores and two cladding layers surrounding the core are disclosed, for example, in U.S. Pat. Nos. 6,477,307; 6,483,973; 5,966,491 and 5,949,941.

Double clad optical fiber has been used in applications requiring utilization of optical sources providing between 10 to 100 Watts of optical power, because double clad optical fiber is more efficient in retaining/utilizing optical power provided by the pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the core-to-inner cladding interface, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

In a double-clad laser, an outer cladding of the optical fiber confines the pump light provided by an optical pump in the optical fiber's multi-mode inner cladding. The much smaller cross-sectional area of the optical fiber's core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030 nm-1120 nm, respectively). Thus, conventional double-clad arrangements facilitate pumping of the fiber using a multi-mode inert cladding for accepting and transferring pump energy to a core along the length of the device. Double-clad laser output can also be used to pump a cascaded Raman laser to convert the wavelength to around 1480 nm, which is suitable for pumping erbium.

All-glass, Yb doped optical fibers are known. An example of such fiber is disclosed in U.S. Pat. No. 6,411,762. The disclosed fiber, however, is not suitable for high power applications because it has a relatively low outer cladding diameter and NA, and therefore, low coupling efficiency due to light leakage outside of the optical fiber. That is, a relatively large portion of the light does not enter the optical fiber and is lost. Although this may not be an issue in applications when only a small amount of optical power needs to be coupled into the fiber, such fiber is not efficient for high power applications when the light source power is 100 Watts or more.

Although Yb doped optical fibers have high quantum efficiency (QE) and low quantum defect (QD), when Yb concentration becomes high (1 wt % or higher), the laser efficiency of such fibers tends to drop significantly. The laser slope efficiency for highly doped Yb fibers (more than 1 wt % Yb) is generally lower than 70%. This limits the amount of Yb dopant that practically can be used in the fiber. Furthermore, achievement of the high power (larger than 1 KWatt) output from the Yb doped fiber laser is made difficult by various non-linear effects, such as the stimulated Raman Scattering (SRS), stimulated Brillion Scattering (SBS), and self phase nodulation (SPM).

It has, therefore, been an area of ongoing development to obtain an optical fiber that for use as high power optical amplification medium, which is highly efficient and which exhibits minimum nonlinear effects.

SUMMARY OF THE INVENTION

Definitions

The following definitions and terminology are commonly used in the art.

Refractive index profile—the refractive index profile is the relationship between the refractive index ($\Delta\%$) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent Δ%—the term Δ% represents a relative measure of refractive index defined by the equation:

$$\Delta\% = 100 \times (n_i^2 - n_c^2)/2n_i^2$$

where Δ % is the maximum refractive index of the index profile segment denoted as i, and $n_c$, the reference refractive index, is taken to be the refractive index of the cladding layer. Every point in the segment has an associated relative index measured relative to the cladding.

Laser Slope efficiency—slope efficiency is defined by the ratio of the output power at the lasing wavelength (e.g., about 1 micron) over the input (absorbed) pump-power at the pump wavelength (e.g., about 976 nm).

According to the present invention the optical fiber includes:
  (i) a silica based, rare earth doped core having a first index of refraction $n_1$, the core comprising more than 1 wt % of rare earth dopant, the core having attenuation of less than 5 dB/km at a wavelength situated between 1150 nm and 1450 nm and less than 20 dB/km at the wavelength of near 1380 nm, and slope efficiency of over 0.7 (70%); and
  (ii) at least one silica based cladding surrounding the core and having a second index of refraction $n_2$, such that $n_1 > n_2$.

One advantage of the optical fiber of the present invention is its capability to produce very high gain, thus being capable for use in a high power laser or an optical amplifier while (i) having high efficiency (with laser slope efficiency over 0.7 (70%)), and (ii) low core attenuation (i.e. low loss). The high power laser or an optical amplifier could use shorter length of this fiber, as compared of fibers with lower rare-earth dopant concentration, while raising the SBS threshold, for example by a factor of 2 or 3 or more. Another advantage of the optical fiber of the present invention is that because it performs both as a high gain fiber and the SP fiber, it eliminates the need to for splicing together gain fiber and the single polarization fiber, thereby reducing the splicing loss, the overall fiber length, while eliminating work and cost associated with splicing the two fibers together. Furthermore, high Yb concentration of the optical fibers according to the present invention advantageously allows a shorter fiber length used, hence significantly reducing the impact of nonlinear effects such as SRS, SBS and SPM.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE EMBODIMENTS

Reference will now be made in detail to the present preferred embodiments of the invention, examples of which are illustrated in the accompanying drawings. Whenever possible, the same reference numerals will be used throughout the drawings to refer to the same or like parts. One embodiment of double clad single polarization optical fiber in accordance with the present invention is shown schematically in FIG. 1A, and is designated generally throughout by the reference numeral 10. The optical fiber 10 illustrated in FIG. 1A includes: an, silica based, highly Yb doped doped core 12 having a first index of refraction $n_1$; and a first silica based cladding 14 (inner cladding) surrounding the core 12 and having a second index of refraction $n_2$, such that $n_1 > n_2$ The Yb concentration in the core 12 is greater than 1 wt %. A protective coating 18 (not shown) surrounds the cladding 14.

Figure 1A:
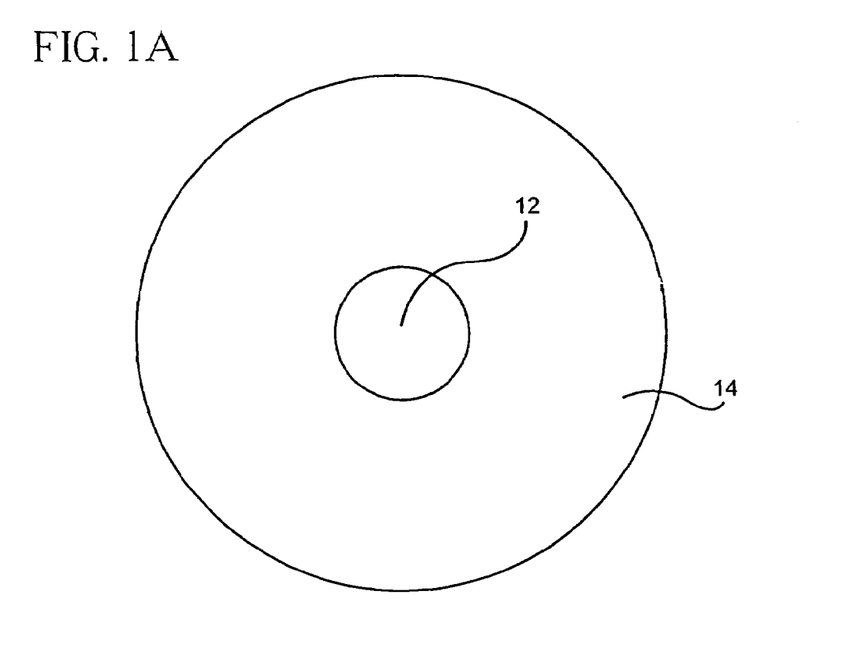
FIG. 1A is a schematic cross-sectional view of one embodiment of the fiber present invention.
Figure 1B:
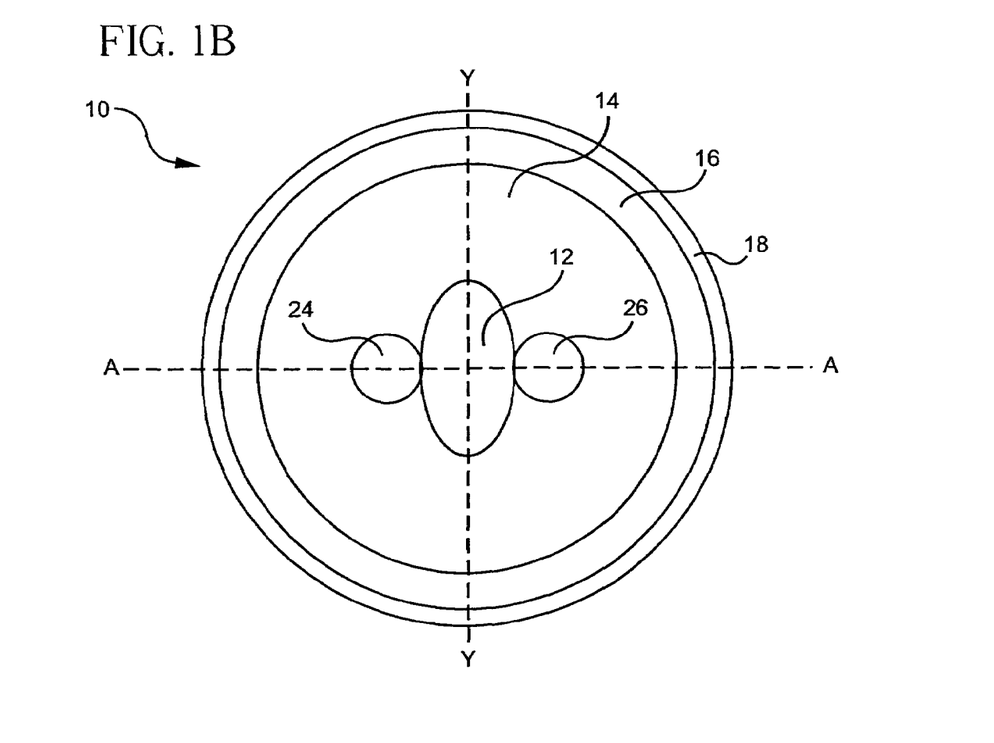
FIG. 1B is a schematic cross-sectional view of another embodiment of the present invention.

Another embodiment of double clad single polarization optical fiber in accordance with the present invention is shown schematically in FIG. 1B, The optical fiber 10 illustrated in FIG. 1B includes: an elongated, silica based, rare earth doped core 12 having a first index of refraction $n_1$; a first silica based cladding 14 (inner cladding) surrounding the core 12 and having a second index of refraction $n_2$, such that $n_1 > n_2$; and an optional silica based outer cladding 16 surrounding the first cladding 14 and having a third index of refraction $n_3$. In this embodiment the inner cladding 14 contains at least two air holes 24, 26, preferably situated on diametrically opposite sides of the core 12 and extending along the core 12, through the length of the fiber 10, in order to provide the fiber with single polarization or the polarization maintaining property. The air holes 24, 26 lower the effective refractive index of the inner cladding 14 along the line A-A illustrated in FIG. 1B and enhance or enable single polarization property of this fiber. The air holes 24, 26, are optional and in their absence the fiber 10 will function as active (i.e., gain) fiber, but will not exhibit single polarization or the polarization maintaining property. The core 12, inner cladding 14 and the outer cladding 16 are made of glass. A protective coating 18 surrounds the outer cladding 16. As discussed above, if the fiber 10 is designed to have only one cladding 14, the protective coating 18 surrounds the cladding 14. However, a double fiber clad structure is preferable, because it allows more efficient pumping of the rare earth fiber core 12. The outer coating 18 may be, for example, an organic coating which typically includes a softer primary coating and a harder secondary coating applied over the primary coating.

In this embodiment the silica based core 12 is doped with Yb. The core 12 may also include at least one index raising dopant. The outer cladding further 16 preferably includes an index lowering dopant, such that $n_2 > n_3$. The inner cladding diameter $D_{IN}$ is preferably at least 125 μm and more preferably at least 200 μm. It is even more preferable that inner cladding diameter $D_{IN}$ is at least 225 μm and most preferable at least 250 μm. Applicants discovered that the thick inner cladding 14 and all-glass construction of the optical fiber work in synergy to allow the optical fiber to be coupled to high energy source, and to couple the high power into the core without damaging the optical fiber, while two air holes make this fiber a single polarization fiber. The size of the air holes may vary, preferably from 7 to 20 μm in diameter, depending on the desired size (minor axis) of the fiber core.

It is preferable that the outer cladding 16 be relatively thin, with wall thickness less than 80 μm and preferably between about 5 μm and 35 μm. It is most preferable that the wall thickness of the outer cladding 16 be between about 10 μm to 25 μm. It is preferable that the diameter Dc of the fiber core 12 be about 5 μm to 20 μm, the inner cladding diameter $D_{IN}$ be about 125 μm to 2000 μm and more preferably about 125 μm to 1500 μm. It is even more preferable that $D_{IN}$ be about 125 μm to 350 μm. It is preferable that the diameter of the outer cladding diameter ($D_{OUT}$) be about 145 to 2100 μm, more preferably about 145 μm to 500 μm. If the inner cladding 14 does not have a circular cross section, Din is defined as the smallest distance from one side of the inner cladding's cross section to the oppositely situated side of the cross section. It is also noted that the outer cladding 16 may not be circular. If the outer cladding 16 is not circular, $D_{OUT}$ is defined as the smallest distance from one side of the outer cladding's cross section to the oppositely situated side of the outer cladding's cross section. It is preferable that the inner cladding's 14 cross-sectional area be at least 200 times larger than the cross sectional area of the core 12.

According to this embodiment, the fiber core 12 includes, in weight percent:

| Rare earth | over 1 wt % |
|---|---|
| Al | 0.5 to 15 wt %; |
| Ge | 0.1 to 15 wt %; |
| F | 0 to 1 wt %. |

The rare earth dopant, Yb, in the fiber core 12 has a high active ion concentration over 1 wt %, yet still enables a highly efficient gain for lasing action with slope efficiency over 0.7 (70%), preferably over 0.75 (75%), even more preferably over 0.8 (80%), and most preferably over 0.85 (85%). The slope efficiency is the ratio of the output power at the lasing wavelength of about 1 micron over the input (absorbed) pump-power at the pump wavelength of around 976 nm. It is preferable that the amount of rare earth dopant in the core 12 be 1.05 to 3 wt %. Phosphorus may be added to the as a refractive index raising agent. However too much phosphorus (10% or more) provides nonlinearity through Stimulated Raman Scattering/defect creation, which may inhibit the lasing action. Aluminum may be added to the core as a de-clustering agent (for example, to de-cluster Yb, preferably at the ratio of Al to Yb of 3:1 to 5:1). The core 12 may also include Germanium which is an index raising dopant, and/or fluorine which is an index lowering dopant as well as a de-clustering agent.

The preferred ranges of the core 12 composition in weight percent are:

| Rare earth | 1.05 to 2 wt % |
|---|---|
| P | 0 to 2 wt %; |
| Al | 2 to 10 wt %; |
| Ge | 3 to 15 wt %; and |
| F | 0.1 to 0.5 wt %. |

The Yb-doped core 12 will laze at 1.03-1.11 micron range.

It is preferable that the inner cladding 14 contain 5 wt % to 30 wt % Ge in order to provide high NA. It is even more preferable that the inner cladding comprise 5 wt % to 20 wt % Ge. It is noted that 5 wt % to 10 wt % Ge works well for many applications.

It is preferable that the index lowering dopant of the outer cladding 16 comprises Fluorine and/or Boron in weight percent:

| F | 0.5 to 5 wt %; |
|---|---|
| B | 0.5 to 20 wt %. |

The amount of dopant(s) for the outer cladding 16 is chosen to preferably result in inner cladding NA of between 0.15 to 0.5. However, it is preferable that the outer cladding 16 contain at least one of B or/and F. It is preferable that the amount of B is at least 3 wt %. It is preferable to have more than 1 wt % and more preferably more than 2 wt % of F along with more than 8 wt % of B in the outer cladding 16. It is preferable that the outer cladding 16 has less than 5 wt % of F, and less than 15 wt % of B. It is even more preferable that the amount of B and F be: 2 to 4 wt % of F and 3 to 15 wt % of B.

The inner cladding 14 of the optical fiber may be is non-circular. The advantage of non-circular inner cladding 14 is that non-circular shape improves the absorption of optical pump power into the core 12. The elongated core 12 may be located either at the geometric center of the inner cladding, or may be displaced from the geometric center of the inner cladding.

The optical fiber core 12 is preferably elliptical, as shown in FIG. 1B, but may have a circular (see FIG. 1A), or may have other elongated shapes. As shown in FIG. 1B, adjacent to the core and situated at least partially within the inner cladding 14 are at least two (optional) air holes 24, 26. The elongated (elliptical) core 12, in conjunctions with the air holes 24, 26 renders this optical fiber a single polarization (SP) fiber. It is preferred that the aspect ratio (ratio of major to minor axis) of the elliptical core 12 be at least 1.5:1 and more preferably be between 2:1 and 10:1, because these aspect ratios improve birefringence of the core 12. A fiber with a circular core and no air holes will be suitable for use as a laser or an amplifier fiber, but will not exhibit single polarization.

The core delta is less than 1% Δ and preferably less than 0.5% Δ. The numerical aperture NA of the core 12 is between 0.05 (for high power laser application) and 0.25 (for lower power application). The numerical aperture NA of the core 12 is defined as $(n_1^2 - n_2^2)^{1/2}$, where $n_1$ is the index of refraction of the core 12 and $n_2$ is the index of refraction of the inner cladding 14.

The silica based inner cladding 14 may have a circular outer perimeter, as shown in FIG. 1A (preferably with an off-center situated core), or a non-circular outer perimeter. The numerical aperture NA of the inner cladding 14 is defined as $(n_2^2 - n_3^2)^{1/2}$, where $n_3$ is the index of refraction of the outer cladding layer 16. The inner cladding preferably has numerical aperture NA between 0.15 and 0.45 and more preferably between 0.3 and 0.4.

In general, a double-clad structure that could be used in a fiber laser or in an amplifier includes two claddings. A first (inner) multi-mode cladding acts as a multi-mode pumping core. The inner cladding 14 is adjacent to the core 12 and a second (outer) cladding 16 surrounds the first or the inner cladding 14. The core 12 may be either single mode or multi-mode at the core lasing wavelength. The inner cladding 14 serves as a waveguide with a high numerical aperture NA for the input (pumping) light. That is, the inner cladding serves as a pump cavity. The larger the inner cladding diameter, the more pump light is coupled into the inner cladding from the optical source. The cross-section of the first multi-mode inner cladding ($D_{IN}$ is the shorter dimension of the inner cladding may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode. Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 μm and 0.22 NA, respectively. However, this invention may also be utilized to produce single clad, silica based fiber, highly doped with Yb (more than 1 wt % of Yb).

The light from this light source is then coupled to a double clad optical fiber via high NA and large aperture lenses. With this approach one can obtain 85-90% of coupling efficiency.

EXAMPLES

The invention will be further clarified by the following examples.

Example 1

Figure 2:
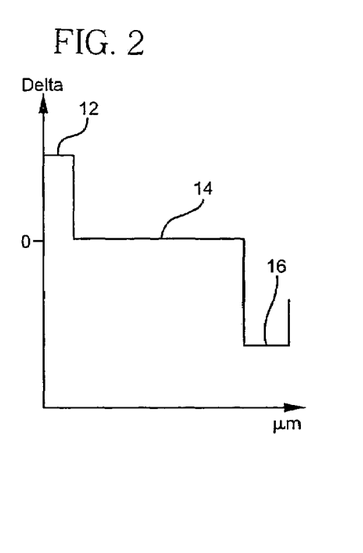
FIGS. 2 and 3 illustrate schematically relative a refractive index profiles of an exemplary optical fiber of the present invention, across two different cross-sections of the fiber.
Figure 3:
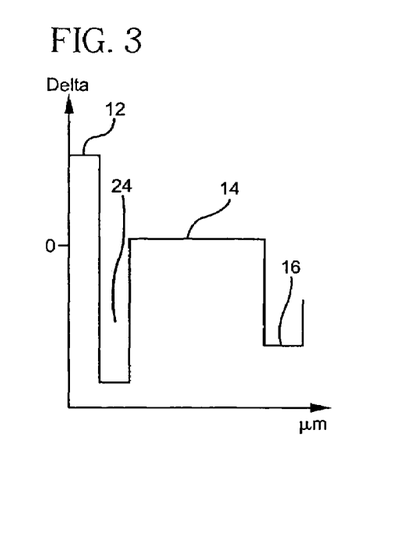

FIGS. 2 and 3 illustrate schematically a relative refractive index profile of a exemplary optical fiber of FIG. 1B. More specifically, FIGS. 2 and 3 depicts optical fiber's refractive index percent delta (relative to that of the pure silica) vs. the distance measured from the core center. FIG. 2 illustrates schematically a refractive index profile taken across the region that does not contain the air holes, for example, along the line Y-Y of the fiber depicted in FIG. 1B. FIG. 3 illustrates schematically a refractive index profile of the same fiber, but taken across the region that contains the air hole 24 (for example, along the line A-A of the fiber depicted in FIG. 1B).

Figure 4:
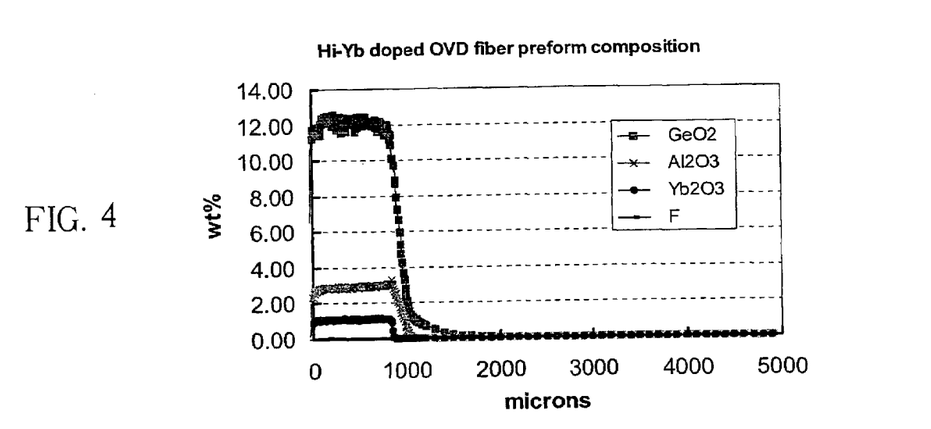
FIG. 4 illustrates an exemplary core composition of the optical fiber of FIGS. 1A and 1B.

FIG. 4 illustrates the exemplary core composition of the optical fiber shown in FIGS. 1A and 1B. The Yb-doped fiber core 12 is single-mode for the wavelengths above 1 μm. The optical fiber 10 has a relatively low NA (about 0.065) for the core 12, and high NA (0.30) for the inner cladding 14. (The NA is defined by $(n_i^2 - n_{i+1}^2)^{1/2}$.) This inner cladding NA is preferably higher than that of the pump-source, allowing high coupling efficiency for the pump light of 90% or better. The small core NA (0.065) enables single mode operation at 1 um with a large core size (10.5 microns diameter). By further bending the fiber, the single-mode operation can be further achieved with the core size close to 50 μm. If the core NA is higher (0.13, for example), the core diameter would have to be substantially smaller (about 5 microns, for example) in order to be single mode. The bigger core diameter and lower core NA allows the core 12 to stay single-mode for high brightness output, while allowing the core to take more pump-power from the inner cladding, and also increases fiber power handling capability via reduced impact from nonlinear effects. The specific composition for the core of this exemplary optical fiber is: Core 12: 1.2 wt % $Yb_2O_3$; 3 wt % $AL_2O_3$; 12 wt % $GeO_2$; 0.2 wt % F; inner cladding 14: 8.5 wt % $GeO_2$; outer cladding 16: 8 wt % B and 2.7 wt % F.

Figure 5A:
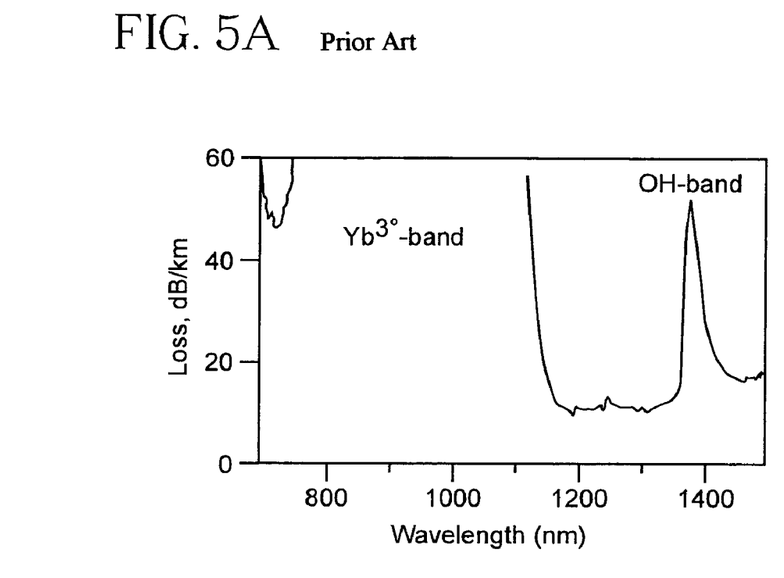
FIG. 5A is a graph illustrating passive core loss vs. wavelength of the Yb doped optical fiber made by the MCVD method.

A passive loss of a Yb doped fiber (~1.0 wt %) made by the MCVD process is illustrated in FIG. 5A. It is known that typical high Yb-doped fibers manufactured by the MCVD fiber process experience severe laser-efficiency problem, evidenced with some extremely high unsaturable absorption. The unsaturable absorption has been found to vary with pumping wavelength, and the worst being pumping into the Yb absorption-peak at 976 nm. This may be attributed it to the impurities and/or the defect-color-centers present in the fiber core. These impurities and defects are typically present in the Yb solution-doped MCVD fibers, and are associated with the higher background loss as shown in FIG. 5A. More specifically, FIG. 5A shows a loss of about 20 dB/km at the wavelength of about 1150 nm, about 10 d/km or higher in the wavelength range between 1200 nm and 1350 mm and over 40 dB at the OH band (about 1400 nm).

Figure 5B:
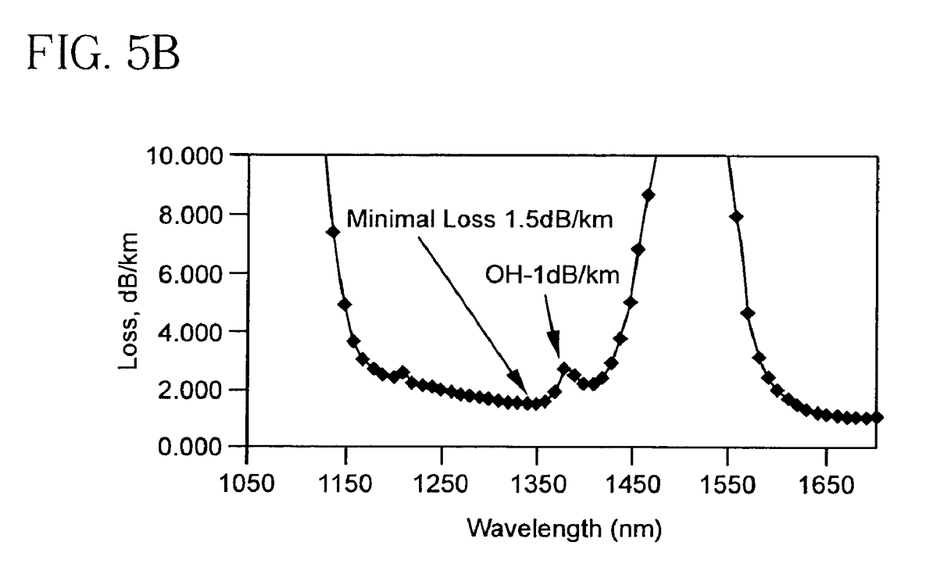
FIG. 5B is a graph illustrating passive core loss vs. wavelength of the optical fiber of FIG. 1B by the OVD method according to one embodiment of the present invention.

The double clad fiber produced by the OVD process is especially suitable for use in a highly efficient, higher power fiber laser device. FIGS. 4 and 5B correspond to the optical fiber of FIG. 1B. More specifically, FIG. 5B illustrates the low passive loss, for example 1.5 dB/km achieved in the Yb-doped core of the fiber of FIG. 1B. The passive loss of the core (also referred to as a background loss) is the inherent loss from the core materials without the absorption-effect from the active dopants such as Yb. More specifically, FIG. 5B shows the low-loss characteristics of the high Yb-doped fiber according to one embodiment of the present invention. It has a minimal loss about 1.5 dB/km much less than that of typically 10 dB/km in the Yb-doped MCVD fiber of FIG. 5A. The OH level in the OVD fiber corresponding to FIG. 5B is about 1 dB/km at 1380 nm, is also much lower than that of about 40 dB/km in the MCVD fiber (see FIG. 5A). The higher background loss in the MCVD fiber is indicative of its high impurities and/or defect-color-centers content. These, plus the high water level, in the MCVD fiber could be the trigger for the fiber's low laser QE, by forming the energy-leaking channel seen as the unsaturable absorption.

Figure 6:
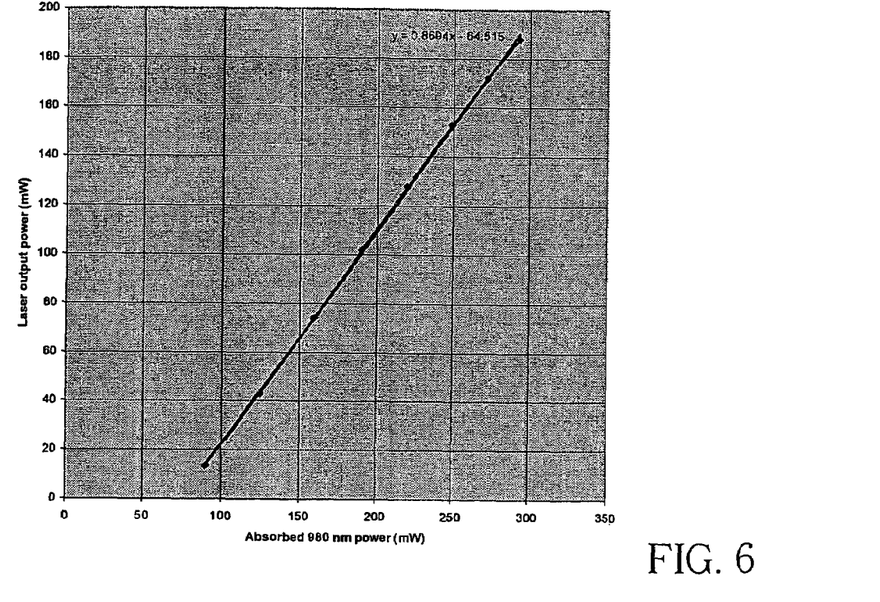
FIG. 6 is a graph of output power vs. launched pump power for the optical fiber of FIG. 1B.

FIG. 6 illustrates highly efficient operation of about 86% laser slope efficiency out of a high Yb-concentration (1.2 wt %) OVD made single mode fiber. More specifically, FIG. 6 is a graph of output power (Watts) versus absorbed input (pump) power (Watts). The optical pump wavelength is 976 nm. The output wavelength is centered on 1 µm. The optical pump is fiber coupled semiconductor laser diode bars (Ga—As/InGaAs). The output from this optical pump was launched into the inner cladding 14 of the double clad optical fiber of FIG. 1B. The efficiency shown in FIG. 6, to our knowledge, is among the highest of any Yb-doped fiber published so far. Thus, this OVD made fiber offers uncompromised laser efficiency despite of its high Yb-concentration, allowing a shorter fiber-length to be effectively used in the fiber laser. The fiber has good power-handling capability and operates well with optical sources that provide optical (pump) power of over 100 Watts. The optical fiber 10 of this example has absorption per unit length (when launching pump power in the inner cladding) up to about 8 dB/m (when having a core/innerclad ratio of 30/400). The optical fiber of FIG. 1B would have a single polarization range of 20 nm to 40 nm, depending on the size (along the minor axis) of the core 12.

Figure 7:
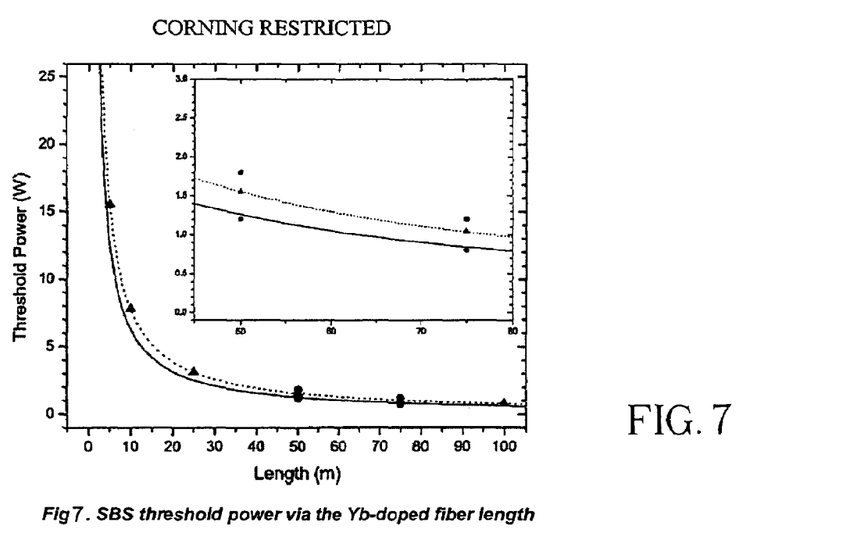
FIG. 7 shows an example of raising the SBS threshold power by reducing the fiber length.

The highly efficient, high Yb-concentration fiber realized by the Yb-vapor doping OVD process allows the practical use of a shorter fiber length to raise the power threshold of the fiber nonlinear process. FIG. 7 is a graph of threshold power (W) vs fiber length. This figure illustrates the raise in the SBS threshold power by reduction in fiber length. For example, shortening the fiber length from our current double-clad fiber design of about 10 meter or so to 5 meters (enabled by high Yb-doping), will raise the SBS threshold power more than 3 times.

THE PROCESS FOR MAKING FIBER

The fiber of FIGS. 1A and 1B is produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making soot-preform. The soot-preform is then consolidated into solid glass in a high temperature furnace, after the bait rod is removed. The core/inner cladding/outer cladding compositions are achieved by utilizing different vapor-ingredients for each of the layers in the soot preform forming process. The core preform is generated first, then consolidated, followed by core/inner cladding preform generation and consolidation, which in turn, is followed by the outer cladding outside vapor deposition process and another consolidation step. The final preform is then drawn into a single or a double-clad single polarization optical fiber 10 by known fiber-drawing methods.

More specifically, the following steps are utilized to make the rare earth doped double clad single polarization fiber of FIG. 1B.

Figure 8:
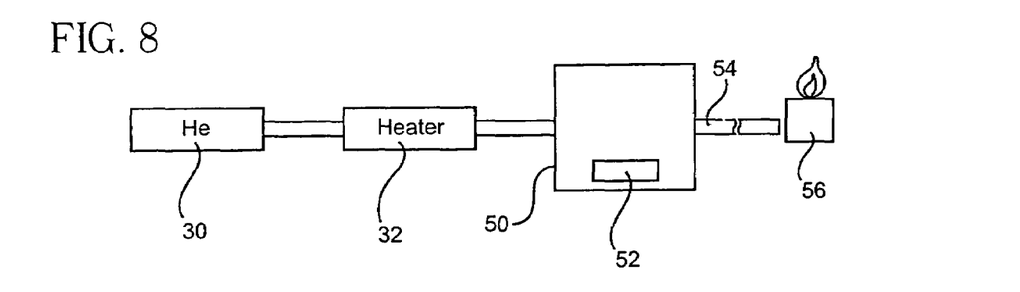
FIG. 8 is a schematic illustration of $AlCl_3$ delivery mechanism.
Figure 9:
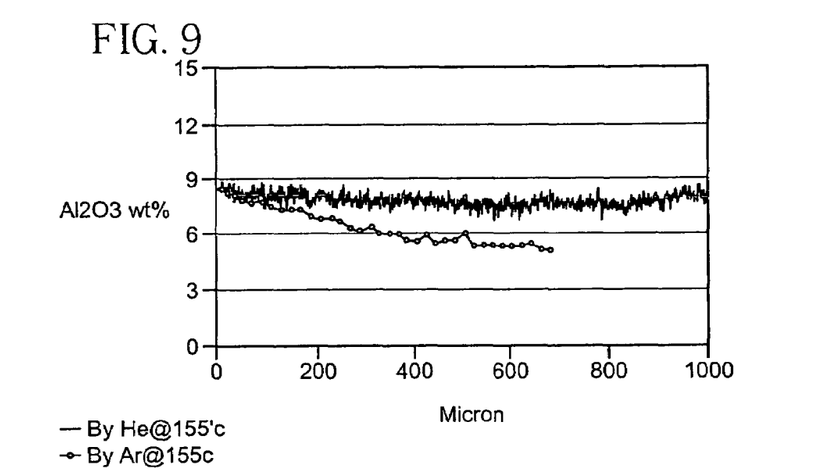
FIG. 9 illustrates $Al_2O_3$ concentration in a preform which resulted from Argon gas delivery (bottom curve) and heated Helium gas delivery (top curve)

1. Core cane formation. The core cane is formed first. The core is manufactured, for example, by a standard OVD process. The core materials are deposited onto the bait rod during the laydown step. The exemplary vapor-precursor-materials used to make the fiber core cane are $Yb(fod)_3$, $AlCl_3$, $SiF_4$, $SiCl_4$, $GeCl_4$ and tri-ethyl borate. Other rare-earth materials may be utilized either in addition to Yb, or instead of Yb. During the core deposition process we achieved a uniform $AlCl_3$ gas-phase delivery. This was accomplished by utilizing heated inert Helium as carrier gas 30 (instead of Argon gas) for $AlCl_3$ delivery illustrated schematically in FIG. 8. As solid $AlCl_3$ changes into vapor (gas) phase, it consumes a large amount of heat. Helium gas has high thermal conductivity; effectively transfers heat to $AlCl_3$, and maintains constant vapor pressure of $AlCl_3$. It is preferable that Helium gas is provided at a temperature within 150° C. to 180° C. range. As illustrated in FIG. 8, the heated Helium gas is provided by the He gas heater 32 to the oven 50 containing $AlCl_3$ vessel 52. The relatively high Helium gas temperature helps to maintain the $AlCl_3$ containing vessel 52 at a constant temperature of about 140° C.-160° C. In order to make the optical fiber of this example, Helium gas was heated via heater 32 to 168° C. and the vessel 52 temperature was held constant at 145° C. Higher vessel temperature results higher concentration of Al in the preform. In addition, the Helium gas flow rate was also adjusted for the most uniform delivery throughout the core doping process. In this example, a 10% flow-rate slope (liter/min) is used for the delivery. (The increase in flow rate with subsequent passes was utilized for all other dopants of the core and claddings.) Heated Helium gas carries $AlCl_3$ vapor via a heated gas line 54 to the flame burner (gas burner) 56. To produce the core preform of this example, a 100 passes of core deposition process is started with 1.2 liter/min (pass #1) and ended (after pass # 100) with 1.65 liter/min, resulting in soot preform core thickness of about 2 mm to 3 mm. Heated Helium based $AlCl_3$ delivery may be utilized not only to form a fiber core, but to also provide Al doping to other fiber layers (e.g. cladding), if uniform Al doping of such layers is desired. Furthermore, heated Helium assisted delivery may be also utilized for materials other than $AlCl_3$, which are also endothermic (i.e. heat-absorbing). An Argon gas delivery instead of the Helium gas delivery of $AlCl_3$ may be utilized, but a Helium gas delivery of $AlCl_3$ results better uniformity of $Al_2O_3$ concentration. (See FIG. 9). It is preferable that $Al_2O_3$ is evenly distributed throughout the core layer because its presence assists in de-clustering of rare earth dopant(s) within the core. This results-in high laser/amplifier efficiency through reduced quenching. This delivery process can also be utilized in Al doped (for example, in order to replace Ge) transmission fiber (i.e. fiber without rare-earth dopants in the core) when a fiber layer with relatively high index of refraction (i.e. higher than silica) is needed.

Figure 10:
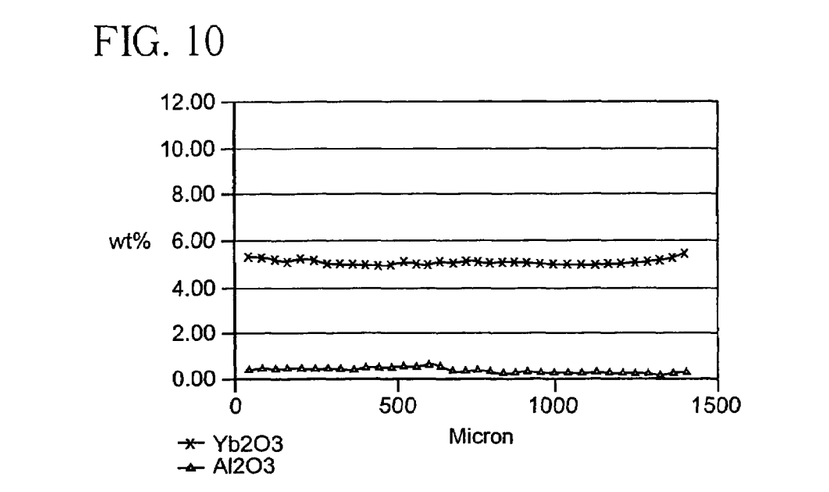
FIG. 10 is a graph illustrating $Yb_2O_3$ and $Al_2O_3$ concentration within a core optical fiber preform.

As shown in FIG. 10, the heated Helium delivery of $AlCl_3$ resulted in a very uniform distribution of Yb and Al throughout the preform core, which results in uniform concentration of Yb and Al within the fiber core 12. More specifically, the resultant variability of $Al_2O_3$ concentration in the core is less than 2 wt % and preferably less than 0.5 wt % and more preferably less than 0.25 wt %, especially for maximum $Al_2O_3$ concentration of over 3 wt %. It is also preferable that the ratio of max wt % to min wt % of $Al_2O_3$ concentration in any given fiber layer (e.g. core, cladding, etc.) be less than 2:1, preferably less than 1.5:1, more preferably less than 1.2:1, and even more preferably less than 1.1:1, especially for maximum $Al_2O_3$ concentration of over 3 wt %.

The Yb vapor delivery is carried by Argon gas at the flow rates up to 15 slpm, preferably 10-12 slpm, and is accomplished by heating organometallic Yb(fod)$_3$ in the temperature range of 150° C.-185° C., preferably 165-185° C., more preferably 170-180° C., which results in a soot preform core with $Yb_2O_3$ concentration from about 1.01 wt % to 3 wt %. In order to make the optical fiber 10 of this example, the Yb(fod)$_3$ containing vessel temperature of 173° C. was used to achieve the $Yb_2O_3$ concentration of more than 1 wt %. The delivery of other materials is carried out by conventional oxygen delivery at temperatures below 100° C.

Figure 11:
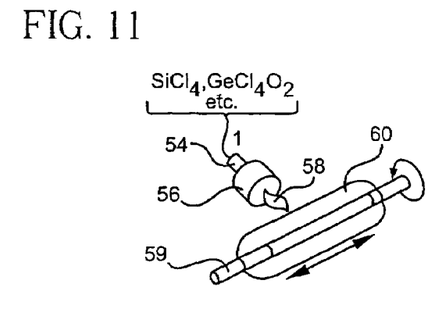
FIG. 11 is a schematic illustration of the formation of a core soot preform.

More specifically, according to one embodiment of the present invention, the Yb(fod)$_3$, $AlCl_3$, $SiF_4$, $SiCl_4$ and $GeCl_4$ are delivered to a gas burner 56. (See FIG. 11.) The gas burner 56 operates at a temperature of about 2000° C. The predetermined amounts of various vapor-phase materials delivered for each core (or clad) stage are carried by oxygen provided to the burner 56, and react in the burner flame 58 where the desired glass-soot particles formed. The soot particles are then deposited onto a rotating bait-rod 59 or core cane 60 through the thermophoretic mechanism to result in the designed soot-preform 62 which will be used to manufacture single polarization fiber with the Yb-doped single-mode core.

Figure 14:
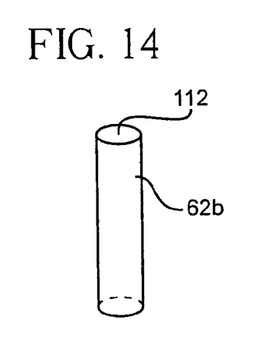
FIG. 14 illustrates schematically a core cane utilized to manufacture the fiber of FIGS. 1A and 1B.

After the core soot preform layer is layered down and the soot preform 62 is cooled to room temperature, the bait rod 59 is removed from the center of core soot preform 62. The core soot preform 62 is then consolidated (densified into the solid glass) to become a solid glass-preform 62A which is drawn into core cane 62B. (See FIGS. 12 and 14.)

Figure 12:
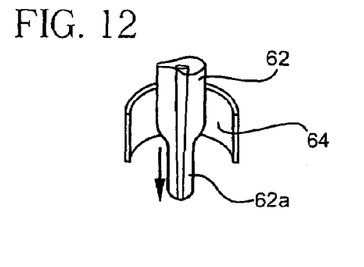
FIG. 12 illustrates consolidation of a soot preform into a glass preform.

Applicants discovered that a proper choice of high temperature and fast down-feed rate during consolidation results in low crystallization formation in the resulting solid glass preform, which results in an optical fiber having very low passive (background) loss, and also eliminates the conventional double-redraw process associated with Al doped blanks. More specifically, soot preform 62 is down fed relative to the furnace at the rate and temperature sufficient to minimize crystallization such that the background loss of the resultant fiber core is less than 8 dB/km, and preferably 3 dB or less, at a wavelength of 1280 nm. As illustrated in FIG. 12, the 'core' soot preform 62 is consolidated into solid glass-preform 62A in a high temperature (1400° C. to 1600° C.) furnace 64. It is preferred that the furnace temperature during consolidation be 1500° C. to 1600° C., and more preferably 1530° C. to 1580° C. In order to produce the optical fiber 10 of this example we utilized the furnace temperature of 1550° C. Applicants found that for temperatures of below 1500° C. the preform glass forms crystals and the amount of crystallization is significantly reduced with furnace temperatures of above 1530° C. While in the furnace, the soot preform 62 is moved relative to the furnace 64 (e.g., down-fed) at a rate of 7 mm/min or faster. It is preferred that this rate be 12 mm/min to 18 mm/min. The optical fiber of this example made by down-feeding the soot preform 62 at the rate of 14 mm/min. It is noted that instead of down-feeding the soot preform, the soot preform may be held in a constant position and the furnace may be moved instead. Thus, by specifying that the soot preform is moved relative to the furnace, applicants intend to cover any relative movement between the soot preform and the furnace. Generally, it is recommended that the higher the furnace temperature, the faster the rate of relative motion between the furnace and the soot preform.

With the above described high consolidation temperatures and fast down-feed rate, the resultant optical fiber 10 has the core background loss of less than 8 dB/km. More preferably, the optical fiber exhibits core background loss of less than 5 dB/km. In this example the background loss of the core is less than 3 dB/km. The core background loss was measured by making (single mode) optical fiber without the outer cladding and measuring the background loss of this fiber.

The core soot preform 62 has sufficient amount of Ge to produce, after the cladding process is completed, a fiber with core delta of 0.06 to 0.1%. After the core preform 62 has been consolidated, as described above, it is drawn into the core cane 62B. The core cane 62B is preferably 1 meter long and about 8 mm in diameter. The core cane 62B is illustrated schematically in FIG. 14.

Figure 15:
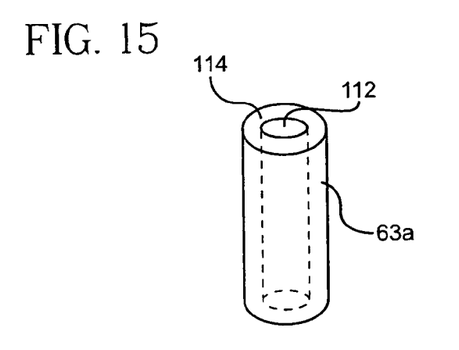
FIG. 15 illustrates schematically a core-clad cane utilized to manufacture the fiber of FIGS. 1A and 1B.
Figure 16:
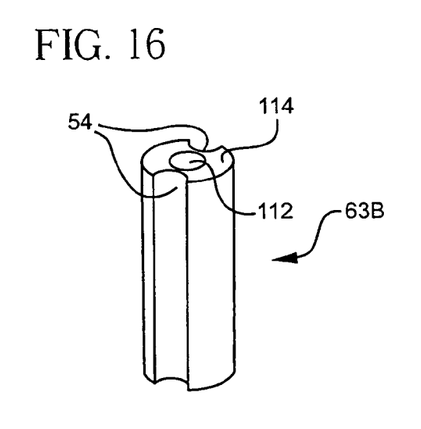
FIG. 16 illustrates schematically a grooved cane utilized to manufacture the fiber of FIGS. 1A and 1B.

2. First clad blank formation. The core cane 62B is overclad with silica soot to form a core/clad (soot) blank (referred herein as the first clad bank 63). The first clad blank is then consolidated to form cane 63A. The first clad blank 63 has a core to the first clad diameter ratio of 0.4 to 0.6. The cane 63A is about 42 mm in diameter. Cane 63A is illustrated schematically in FIG. 15.

Alternatively a sleeving process may be utilized to form cane 63A, by placing a silica sleeve around the core cane 62A.

Figure 13:
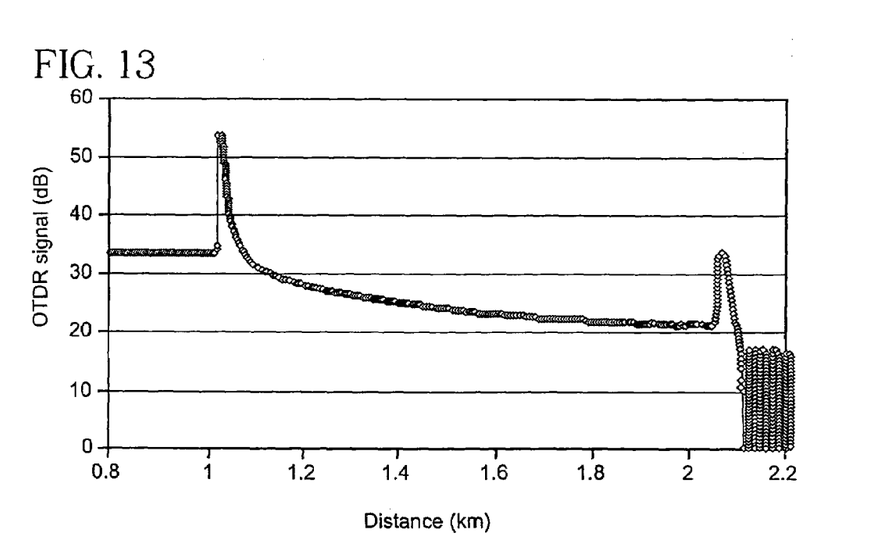
FIG. 13 illustrates inner cladding background loss of an exemplary fiber.
Figure 18:
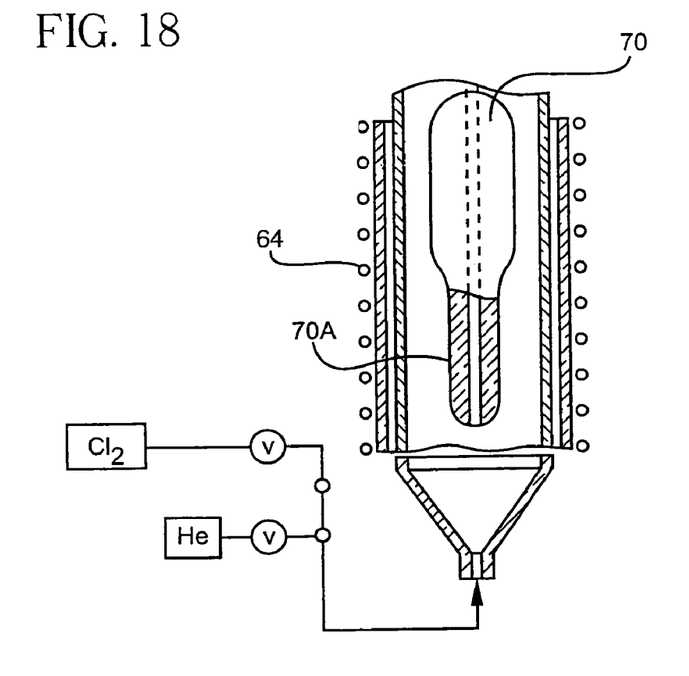
FIG. 18 illustrates schematically an exemplary consolidation process utilized to manufacture the fiber of FIGS. 1A and 1B.

3. Grooved cane formation. The cane 63A includes sections 112, 114 which correspond to the core 12 and the first cladding layer 14 of the optical fiber 10. Cane 63A is preferably about 1 meter long and about 8 mm in diameter. Grooves 54 are then ground into the diametrically opposite longitudinal sides of the cane 63A to a width of about 6.4 mm and to a depth of about 8 to 10 mm, thereby forming grooved cane 63B. (See FIG. 13.) The groove depth depends on the thickness of the first clad layer, but should be such that its bottom substantially abuts the section 112 (corresponding to the fiber core 12), as illustrated in FIG. 18. The grooved cane 63B is HF etched for about 30 minutes to clean any grinding residue and then redrawn to an appropriate size cane (OD of about 8 mm).

Figure 19:
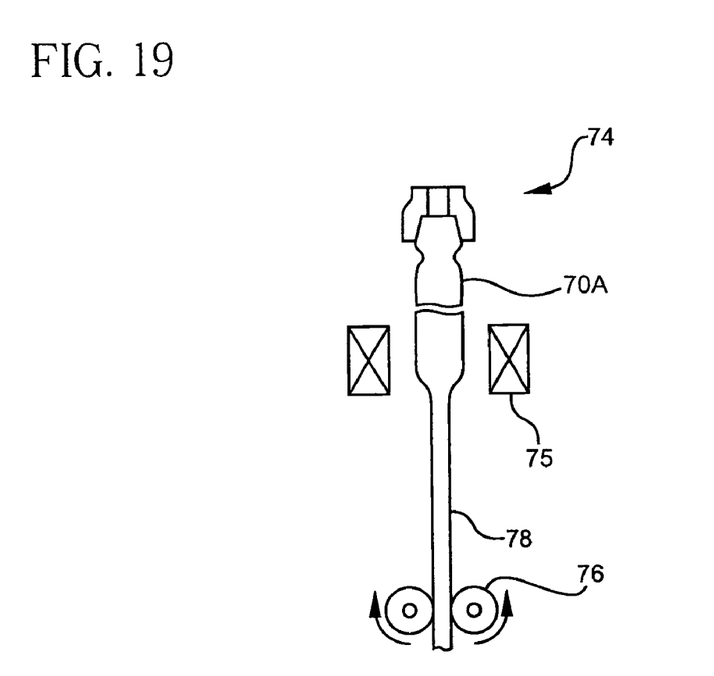
FIG. 19 illustrates schematically a redraw tower utilized to manufacture the fiber of FIGS. 1A and 1B.

The grooved and redrawn cane 63B is then inserted into a 1 meter long silica tube or sleeve 65 overclad with silica soot 67 (for example, about 800-1000 gms.), as shown in FIG. 19, to form a preform subassembly 70. Silica overcladding 67 method on the sleeve 65 is preferably produced by an Outside Vapor Deposition (OVD). The exemplary silica tube 65 may have an inner diameter of about 8.8 mm and an outer diameter of about 11.8 mm which supports a layer of silica soot 67. The silica tube baring soot is cleaned, both inside and outside, with a chemical solvent or alcohol (IPA for example), prior to the insertion of the etched and re-drawn cane 63B into the tube 65. If needed, the two holes 24, 26 in the preform subassembly 70 may be further etched via HF to enlarge the holes.

Figure 17:
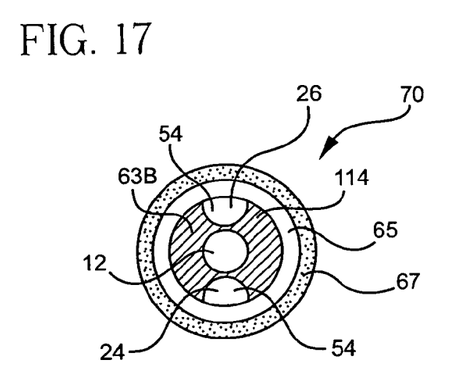
FIG. 17 illustrates schematically a glass tube with the inserted grooved cane of FIG. 16.

The preform subassembly 70 of FIG. 17 is then consolidated in accordance with a conventional consolidation process as shown in FIG. 18 by first drying in a consolidation furnace 64 in an atmosphere of $Cl_2$, and then consolidating in the furnace in a He-containing atmosphere to produce a consolidated preform 70A. The consolidated preform 70A is then inserted into a redraw tower 74 as shown in FIG. 19. The preferred down feeding rate is about 7 mm/min. Heat is applied to preform 70A by heating element 75 and it is drawn down by tension applying wheels 76 into an approximately 7-8 mm diameter cane 78. While the redraw process (drawing to a smaller diameter core cane from the preform) is occurring, a positive pressure (about 1 psi) is applied to the holes 24, 26 sufficient to keep them from closing. The pressure may be sufficient to cause the central core to elongate slightly. The pressure used is a function of the draw temperature, glass viscosity, and draw speed among other factors.

Figure 20:
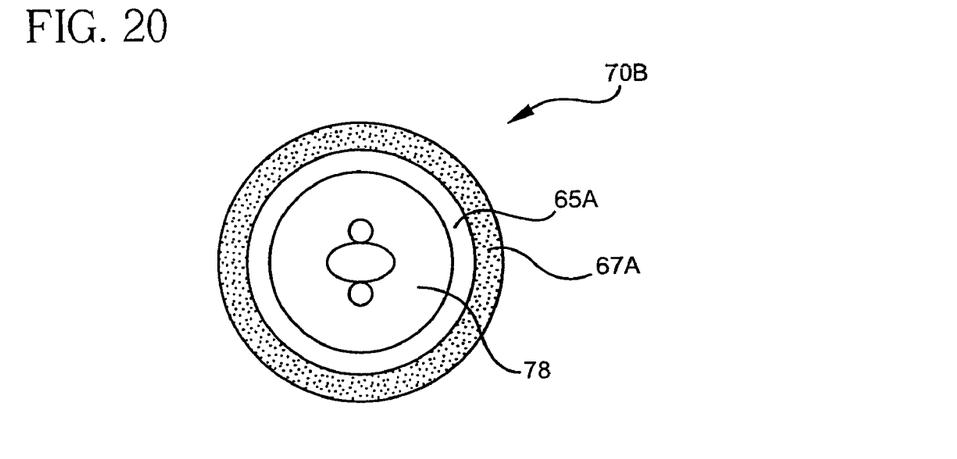
FIG. 20 illustrates a preform subassembly that includes a silica tube overclad with silica soot.

This cane 78, now having an elliptically shaped central core and air holes, is again inserted into a 1 meter long silica tube 65A which is overclad with about 1000 grams of silica soot 67A, as shown in FIG. 20 to form preform subassembly 70B. This preform subassembly 70B is consolidated in the same manner as heretofore to form consolidated blanks 70C. The consolidated blanks 70C will form the basis for the core and the inner clad portion of the optical fiber 10.

Figure 21:
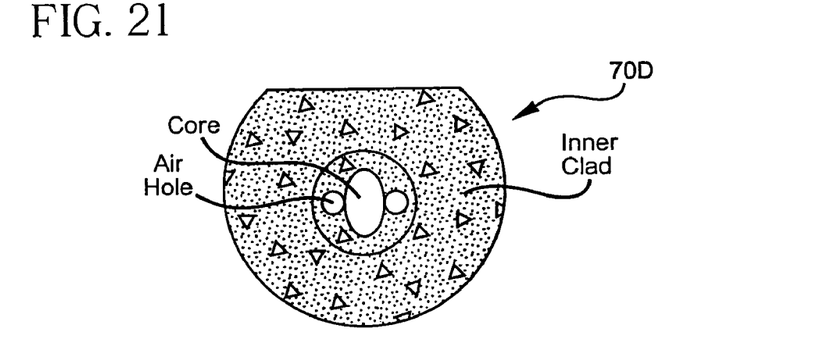
FIG. 21 illustrates a (optionally) machined core/inner clad blank.
Figure 22:
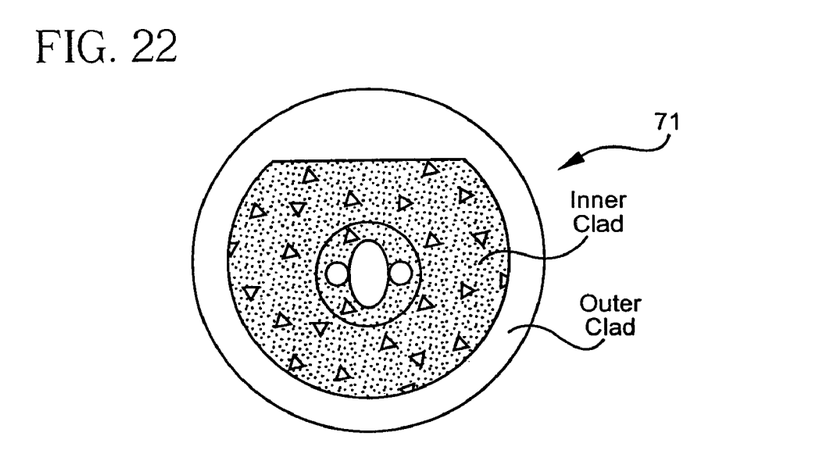
FIG. 22 illustrates a consolidated blank after the core/inner cladding blank it has been optionally machined as shown in FIG. 21, and overclad with the silica based outer cladding material.

The consolidated blanks 70C are then machined, if needed, to desired shape. Breaking circular symmetry in the inner clad layer enhances pump light absorption efficiency. A machined core/inner cladding blank 70D is illustrated schematically in FIG. 21. The machined blank 70D is overclad again, for example by $SiO_2$ with index lowering dopants and then consolidated to a consolidated blank 71. The down-doped silica layer of the consolidated blank 71 will form the second, or outer cladding 16 of the optical fiber 10. FIG. 22 illustrates schematically an exemplary consolidated blank 71. If boron is used in overcladding, it is preferred that consolidation is performed in Fluorine environment. In this example, the index lowering dopants are B and F.

More specifically, $B_2O_3$ and $SiO_2$ were vapor deposited on the ground glass preform to form a $B_2O_3$ and $SiO_2$ soot layer by using tri-ethyl borate and $SiCl_4$ delivered to the burner. The blank (i.e. machined or ground glass preform) covered with the $B_2O_3$-doped silica soot layer was then Fluorine doped during the consolidation step by using $SiF_4$ gas provided to the consolidation furnace. During this second consolidation step, the consolidation furnace is operated at the temperature range of 1300° C.-1400° C. At these consolidation temperatures Fluorine diffuses into the boron/silica soot layer, but does not penetrate into the underlying glass layer. The optical fiber of this example was produced by utilizing consolidation temperature of 1350° C., so as to facilitate adequate Fluorine doping through diffusion. In this example, the third layer of the preform (outer cladding) has a shape similar to that of the second layer (inner cladding).

Figure 23:
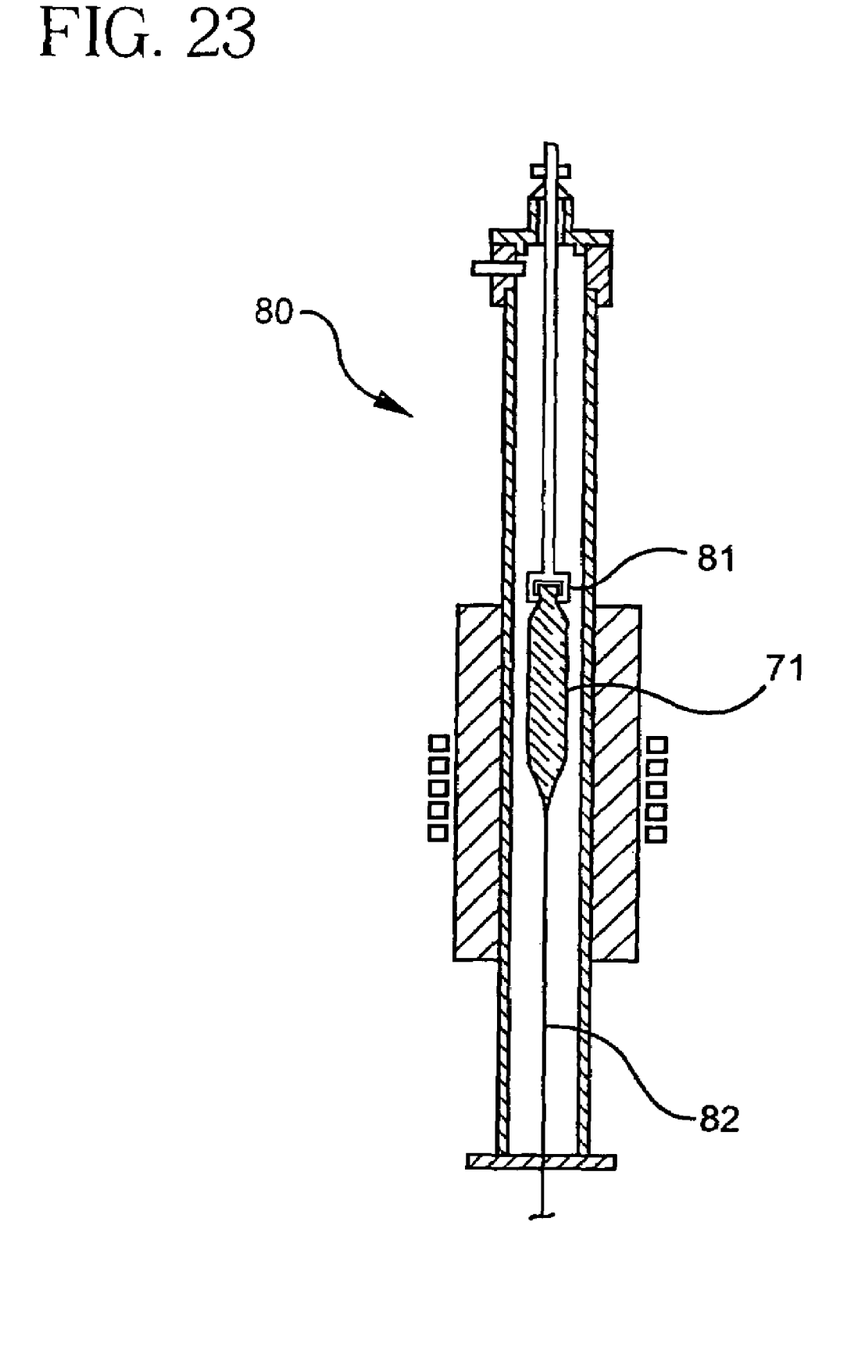
FIG. 23 illustrates schematically a process for drawing fiber utilized to manufacture the fiber of FIGS. 1A and 1B.

The consolidated blank 71 is then suspended from a handle 81 in a draw furnace 80 as shown in FIG. 23 and a fiber 82 is drawn therefrom. During draw, a small positive pressure (about 1 psi or less) is applied to the holes to keep them from closing. This causes the core to become (more) elliptically shaped. In the exemplary fiber depicted in FIGS. 1A and 1B we utilized positive pressure of less than 0.1 psi. The draw speed was about 1 m/sec. The resulting fiber has an elliptically shaped core and dual air holes.

As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. An optical fiber comprising:
 (i) a silica based, rare earth doped core having a first index of refraction $n_1$, said core comprising more than 1 wt % of rare earth dopant, said core having attenuation of less than 5 dB/km at a wavelength situated between 1150 nm and 1450 nm and less than 20 dB/km loss at the wavelength of 1380 nm, and slope efficiency of over 0.7;
 (ii) at least one silica based cladding surrounding the core and having a second index of refraction $n_2$, such that $n_1 > n_2$.

2. An optical fiber comprising:
 (i) a silica based, Yb doped core having a first index of refraction $n_1$, said core comprising more than 1 wt % of $Yb_2O_3$, said core having less than 3 dB/km loss at a wavelength situated between 1150 nm and 1350 nm and less than 4 dB/km loss at the wavelength of 1380 nm and slope efficiency of over 0.8;
 (ii) at least one silica based cladding surrounding the core and having a second index of refraction $n_2$, such that $n_1 > n_2$.

3. An optical fiber comprising:
 (i) a silica based, Yb doped core having a first index of refraction $n_1$, said core comprising more than 1 wt % of $Yb_2O_3$, said core having slope efficiency of over 0.8;
 (ii) at least one silica based cladding surrounding the core and having a second index of refraction $n_2$, such that $n_1 > n_2$, wherein said fiber core has less than 3 dB/km loss at a wavelength situated between 1150 nm and 1350 nm and less than 4 dB/km loss at the wavelength of 1380 nm.

4. The optical fiber of claim 3, wherein said fiber core has less than 2 dB/km loss at a wavelength situated between 1150 nm and 1350 nm and less than 2.5 dB/km loss at the wavelength of 1380 nm and no more than 1.5 dB/km at 1350nm.

5. The optical fiber of claim 3, said fiber further comprising a silica based outer cladding surrounding said cladding and having a third index of refraction $n_3$, such that $n_2 > n_3$.

6. The optical fiber of claim 3, wherein said fiber core comprises: 8-12 wt % $GeO_2$; 2-4 wt % $Al_2O_3$; and 1 wt %<Yb<2 wt %.

7. The optical fiber according to claim 3 wherein said rare earth core is an elongated core.

8. The optical fiber according to claim 7 wherein said core is elliptical and the ratio of its maximum dimension to its minimum dimension is at least 1:1.5.

9. The optical fiber according to claim 8 wherein said cladding contains an even number of air holes, wherein said optical fiber supports a single polarization mode within the operating wavelength range.

10. The optical fiber according to claim 8 wherein said cladding contains an even number of air holes, wherein said optical fiber is a polarization maintaining fiber.

11. The optical fiber according to claim 5 wherein said silica based outer cladding contains at least F or Boron.

12. The optical fiber according to claim 3 wherein said fiber core has more than 1.1 wt % $Yb_2O_3$.

13. The optical fiber according to claim 5 wherein said silica based outer cladding contains both F and Boron.

14. The optical fiber according to claim 3 wherein said at least one silica based cladding contains both F and Boron.

15. An optical fiber comprising:
 (i) a silica based core having a first index of refraction $n_1$, said core comprising, said core having less than 3 dB/km loss at a wavelength situated between 1150 and 1350 nm and less than 4 dB/km loss at the wavelength of 1380 nm;
 (ii) at least one silica based cladding surrounding the core and having a second index of refraction $n_2$, such that $n_1 > n_2$, wherein said at least one silica based cladding contains both F and Boron.

* * * * *